March 1, 1966  H. J. KERR  3,237,997
BRAKING SYSTEMS FOR VEHICLES
Filed Feb. 20, 1964  4 Sheets-Sheet 1

INVENTOR.
HOWARD JOHN KERR
BY Murray J Ellman
HIS ATTORNEY

March 1, 1966     H. J. KERR     3,237,997

BRAKING SYSTEMS FOR VEHICLES

Filed Feb. 20, 1964     4 Sheets-Sheet 2

INVENTOR.
HOWARD JOHN KERR
BY Murray J. Ellman
HIS ATTORNEY

March 1, 1966   H. J. KERR   3,237,997
BRAKING SYSTEMS FOR VEHICLES
Filed Feb. 20, 1964   4 Sheets-Sheet 4

INVENTOR.
HOWARD JOHN KERR
BY Murray J. Ellman
HIS ATTORNEY

United States Patent Office 3,237,997
Patented Mar. 1, 1966

3,237,997
BRAKING SYSTEMS FOR VEHICLES
Howard J. Kerr, 3 Greystoke Court, Hanger Lane,
Ealing, London W.5, England
Filed Feb. 20, 1964, Ser. No. 346,249
9 Claims. (Cl. 303—22)

The present invention relates to braking systems for vehicles. More particularly, the present invention relates to braking systems having anti-skid features.

In conventional braking systems for motor vehicles, the amount of braking pressure applied to the wheels of the vehicle is directly related to the braking force applied to the master cylinder in the braking system. If too much braking force is applied in relation to the speed of he moving vehicle and the conditions of the road surface, the vehicle may skid and go out of control.

Accordingly, it is an object of the present invention to provide a new and improved braking system for wheeled vehicles.

A second object of the present invention is to provide a new and improved braking system having anti-skid features for wheeled vehicles.

Still another object of the present invention is to provide a new and improved braking system for vehicles wherein the maximum braking force applied to the wheels of the vehicle is controlled independently of the maximum force applied to the master cylinder.

With the above objects in mind, the present invention mainly consists of a control unit arranged between a driver-controlled pressure-generating device and at least one motor cylinder arranged at the wheel of the vehicle, the control unit limiting the maximum pressure that may be applied to the wheel and simultaneously varying such maximum pressure in response to variations in factors affecting the adhesion of the wheel to the road surface.

The invention is hereinafter described with reference to the accompanying drawings, in which.

Figure 1:
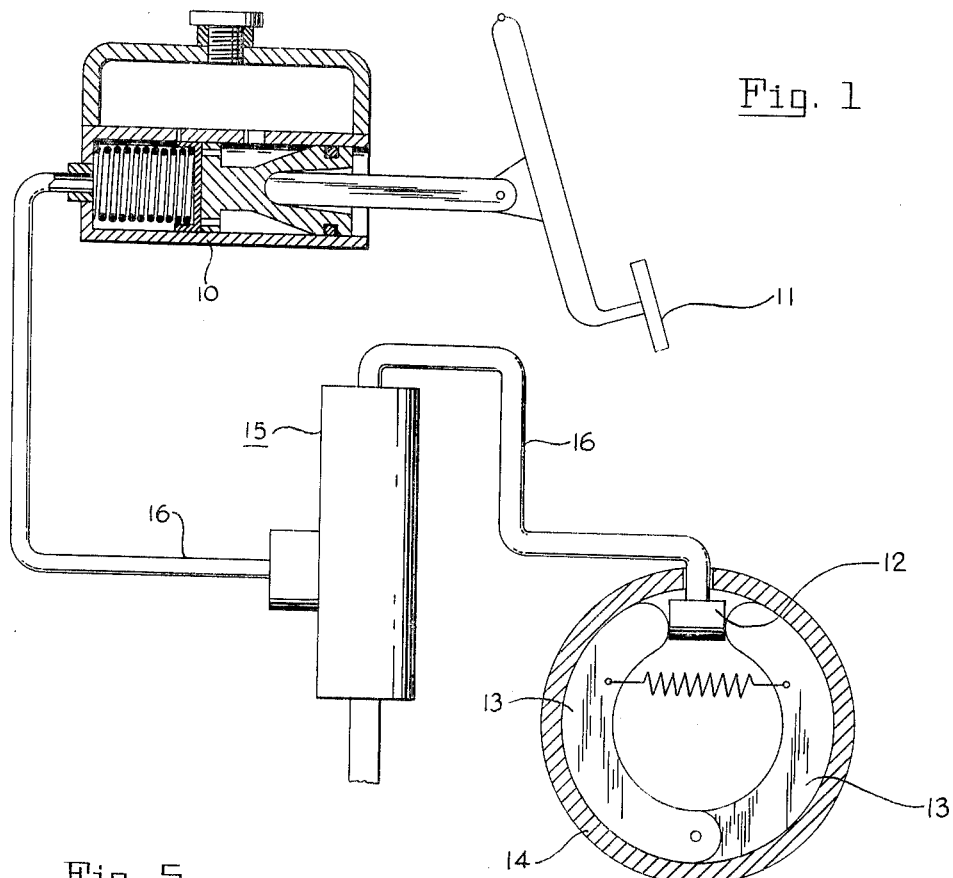
FIGURE 1 is a diagram of a liquid pressure braking system according to the invention.

Referring to FIGURE 1, the braking system shown therein comprises a liquid pressure master cylinder 10 of conventional form operated by a pedal 11, a motor cylinder 12 for operating the shoes 13 of an internal shoe drum brake 14, and a control unit 15 interposed in the conduit 16 connecting the master cylinder 10 to the motor cylinder 12, the control unit, as hereinafter described, serving to limit the maximum pressure which can be exerted in the motor cylinder 12. It will be understood that motor cylinders operating other brakes on the vehicle can also be connected to the control unit 15, or additional control units may be provided, each of which is connected to the motor cylinder operating the brake on one wheel of the vehicle.

Figure 2:
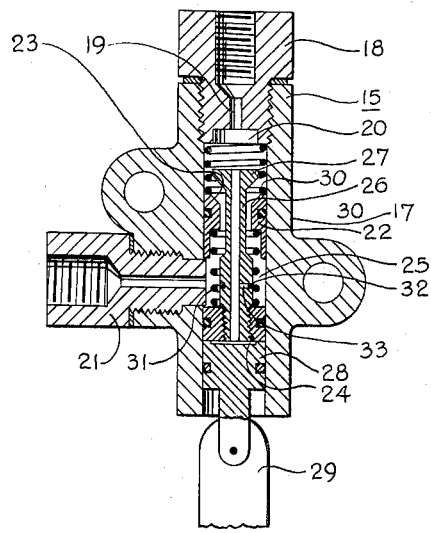
FIGURE 2 is a sectional elevation of one form of control unit for use in the system shown in FIGURE 1, the parts being shown in the positions they take up when the brakes are not in operation and during light braking.
Figure 3:
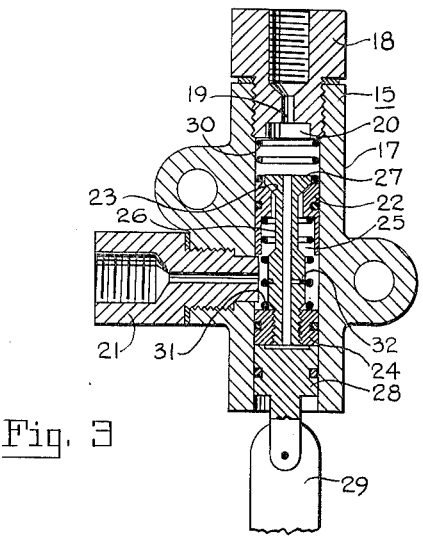
FIGURE 3 is a sectional elevation similar to FIGURE 2, showing the parts in the position they take up during heavy braking.
Figure 4:
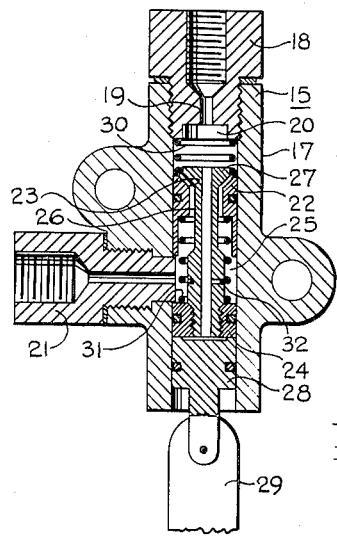
FIGURE 4 is a sectional elevation similar to FIGURE 2 showing the parts in the position they take up during heavy braking with an increased loading of the vehicle.

The control unit 15, as shown in FIGURES 2, 3 and 4, comprises a tubular body 17 closed at one end by a plug 18 in which is formed a passage 19 to which the part of the conduit 16 leading to the motor cylinder 12 is connected. The part of the conduit 16 leading from the master cylinder is connected to a tubular plug 21 screwed into a lateral screw-threaded hole in the body 17, the end of the plug 21 projecting into the bore of the body as shown. An annular piston 22, slidable in the bore of the body between the plug 18 and the plug 21, defines between the said plug and itself a chamber 20, a valve seat 23 being formed at the end of the central aperture in the said annular piston nearest to the plug 18. A second annular piston 24 is mounted in the bore of the body on the other side of the plug 21, so as to define between itself and the piston 22 a space 25, the passage through the piston 24 being screw-threaded to receive the screw-threaded end of a tubular stem 26 which extends through the aperture in the annular piston 22 and has formed on it a valve head 27 to co-operate with the seat 23. A third piston 28, also slidable in the bore of the body 17, abuts against the outer face of the piston 24, the said piston 28 having a cavity in its inner face, and a resiliently loaded thrust rod 29 acts on the piston 28 as will be described with reference to FIGURE 5. A spring 30 in the bore of the body 17 urges the piston 22 towards the plug 21, and a second, lighter spring 31 between the pistons 22 and 24 urges the latter piston towards the piston 28. A resilient ring 32 mounted in a groove in the stem 26 so as to cover a radial passage 33 therein acts as a one-way valve to allow liquid to flow outwardly from the bore of the said stem into the space between the pistons 22 and 24, but prevents flow in the opposite direction.

When the brakes are not in operation, the parts of the control unit are in the positions shown in FIGURE 2, so that the master cylinder 10 and motor cylinder 12 are in free communication one with the other through the aperture in the piston 22. When the master cylinder is operated to apply the brakes, pressure is built up to apply the shoes 13 to the drum, and the pressure reacts on the piston 24 to push it and the piston 28 outwardly. At a pressure depending on the loading of the thrust rod 29, the valve head 27 engages the seat 23, and any further increase in the pressure generated in the master cylinder is not transmitted to the motor cylinder. The parts are now in the position shown in FIGURE 3.

If, during the time when the brakes are applied, the loading of the thrust rod is increased, the pistons are all urged towards the plug 18, as shown in FIGURE 4, and the pressure acting in the motor cylinder and in the chamber 20 is increased in proportion to the said loading, provided that the pressure is not raised above that generated in the master cylinder. If the pressure in the motor cylinder does tend to rise above the master cylinder pressure, liquid escapes from the chamber 20 into the space 25 until the pressures are equalised.

If the loading then decreases, the parts return towards the position shown in FIGURE 3, and if the loading falls below its original value, the piston 28 moves away from the piston 24 due to pressure in the chamber 20 acting, through the bore of the tubular stem 26, in the cavity of the piston 28, so that the combined volume of the chamber 20 and the space between the pistons 24 and 28 is increased, and the pressure acting in the motor cylinders falls.

When the master cylinder piston is allowed to retract, the pressure in the space 25 drops and the parts return to the positions shown in FIGURE 2, so that the brakes are released.

Figure 5:
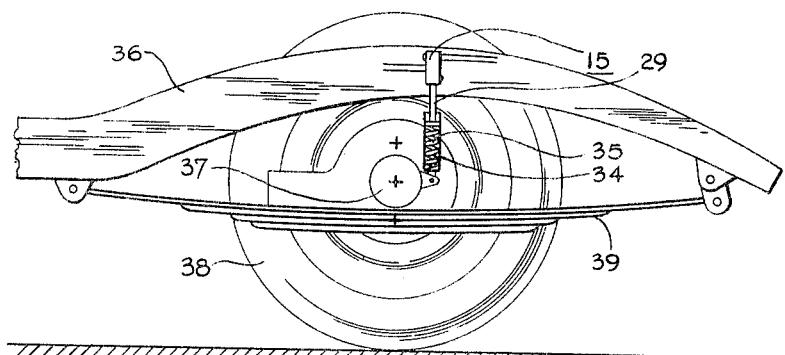
FIGURE 5 is a partial elevation of a vehicle chassis showing means for operating the control unit in response to changes of the loading of the vehicle.

Referring to FIGURE 5, the thrust rod 29 extends into the spring box 34 in which it is acted on by a coiled compression spring 35. The control unit 15 is fixed to a side member 36 of the vehicle chassis frame, and the spring box 34 is connected to the vehicle axle 37 adjacent the wheel 38. The axle 37 is mounted on semi-elliptic springs of which one is shown at 39. The loading of the spring 35, and thrust exerted on the piston 28 of the control unit, are thus determined by the load supported by the wheel 38 of the vehicle adjacent which the spring box 34 is attached to the axle.

Figure 6:
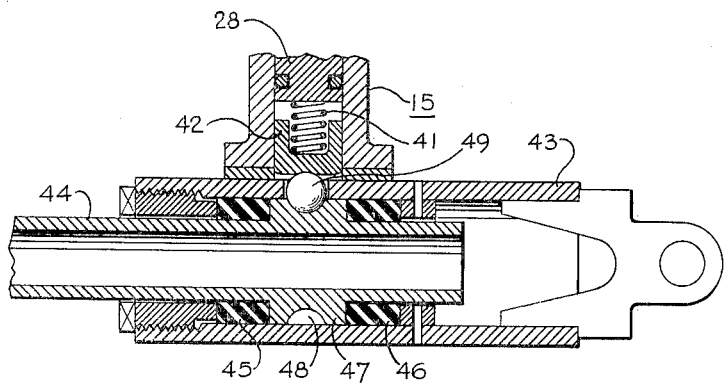
FIGURE 6 shows, in section, one form of means for operating the control unit in response to stress induced during braking.

The loading applied to the piston 28 may depend on the stress applied to the wheel mounting during braking, which varies with the adhesion between the tyre and the road surface, so that braking is automatically reduced if the wheel skids. For example, as shown in FIGURE 6, the piston 28 may be acted upon by a coil compression spring 41 taking its abutment on a tappet 42. A rod member, subjected to tension or compression during braking, is formed in two parts 43 and 44, the part 44 sliding in the part 43 to a very small extent against the resistance of rubber buffers 45 and 46. A collar 47 mounted on the rod part 44 is formed with a V-shaped circumferential groove 48 into which projects a ball 49, located against movement in the direction of the axis of the rod member in a hole in the rod part 43 and engaging the tappet 42. Thus relative longitudinal movement of the rod parts 43 and 44 causes the ball 49 to ride up one side of the groove 48 and displace the tappet 42 to compress the spring 41. The maximum degree of braking thus varies with the stress in the rod 43, 44, and, if the wheel skids, the stress is reduced, so that the brake-applying pressure falls rapidly and the wheel is released for rotation.

Figure 7:
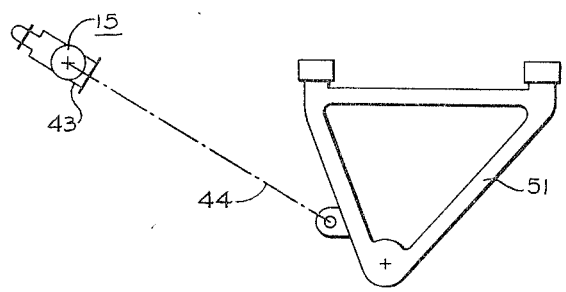
FIGURE 7 is a diagram showing one way of connecting the means of FIGURE 6 into a vehicle suspension system.

The rod member 43, 44 may constitute a radius rod, tie rod or strut forming part of a wheel suspension system. For example, as shown in FIGURE 7, it may be connected between a wishbone member 51 and an anchorage point on the vehicle chassis so that it length is caused to vary by deflection of the wishbone member under braking loads, but not to pivoting movement of the wishbone member in a vertical plane.

Figure 8:
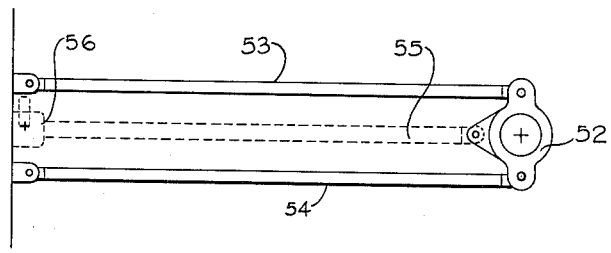
FIGURE 8 shows another way of connecting a control unit operating means into a vehicle suspension system.
Figure 9:
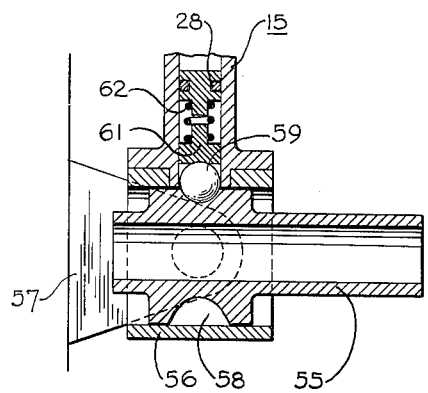
FIGURE 9 is a sectional elevation, on a larger scale, of the control unit operating means shown in FIGURE 8.

In another arrangement, shown in FIGURES 8 and 9, an axle 52 supporting the rear wheels of a vehicle is located in a fore-and-aft direction by parallel links 53, 54, the pivots of the links 53, 54 on the axle and/or on the vehicle chassis being of the rubber bush type so that some longitudinal movement of the axle relative to the chassis takes place under load. A rod 55 pivotally attached to the axle 52 between the links 53, 54 extends into a sleeve mounted to turn about a swivel axis diametral thereto in a bracket 57 on the vehicle chassis. The rod 55 is formed in the sleeve 56, with an enlargement in which is provided a V-shaped circumferential groove 58, acting through a ball 59 and tappet 61 on a loading spring 62 for the piston 28 of the control unit 15, as described with reference to FIGURE 6.

The spring 41 or 62 may exert an initial load such that it produces a pressure in the motor cylinders low enough to prevent skidding of the wheels under the most adverse conditions likely to be encountered by the vehicle, the parts being so arranged that the tappet 42 or 61 engages the piston 28 when the valve head 27 engages the seat 23, thrust due to relative movement of the parts of the rod 43, 44 or of the rod 55 and sleeve 56 being then transmitted directly from the tappet to the piston 28.

Although an internal shoe drum brake has been shown in FIGURE 1, the invention may also be used with other forms of liquid pressure operated brakes, including disc brakes.

I claim:
1. A fluid pressure braking system for wheeled vehicles having braking means adjacent each wheel of the vehicle comprising in combination, a braking pressure generating member remote from said braking means; a control unit including a chamber having three spaced passages through the wall thereof; first fluid conduit means communicating at one of its ends with said chamber by means of one of said passages and communicating at its other end with said braking pressure generating member; second fluid conduit means communicating at one of its ends with said chamber by means of a second of said passages and communicating at its other end with said braking means; and a thrust member having a first end movably mounted in said chamber by means of the third of said passages and having a second end connected to the vehicle on which said wheel is mounted whereby the maximum braking force that may be transmitted from said braking pressure generating member to said braking means is limited by said control unit and is increased or decreased in accordance with the position of said first end of said thrust member in said chamber without change in braking pressure output of said braking pressure generating member.

2. Apparatus as claimed in claim 1 wherein said chamber of said control unit is substantially cylindrically shaped and said first end of said thrust member is substantially piston shaped and movable in said chamber to vary the fluid pressure therein in accordance with the position thereof.

3. Apparatus as claimed in claim 2 wherein said thrust member is moved by a spring the loading of which is varied by changes in the condition in relation to which the maximum braking pressure is to be controlled.

4. Apparatus as claimed in claim 3 wherein the loading of the spring is determined by the loading of the vehicle.

5. A fluid pressure braking system for wheeled vehicles having braking means adjacent each wheel of said vehicle comprising in combination a braking pressure generating member remote from said braking means; a control unit being formed with a substantially cylindrical chamber having at least three passages through the chamber wall thereof, said control unit further having a first piston member disposed in said chamber and slidable between a first position wherein one of said passages is open to fluid flow and a second position wherein said one of said passages is closed to fluid flow; first fluid conduit means communicating at one of its ends with said chamber by means of said one of said passages and communicating at its other end with said braking pressure generating member; second fluid conduit means communicating at one of its ends with said chamber by means of a second of said passages and communicating at its other end with said braking means, said second passage permitting fluid flow into and out of said chamber at all times; and a thrust member having a second piston member at one of its ends communicating with said chamber by means of the third of said passages and movable in said chamber to change the fluid pressure therein, said thrust member being subjected to a thrust varied by changes in a condition in relation to which the maximum degree of braking is to be controlled, said chamber being initially placed under pressure to apply braking force to said braking means by said braking pressure generating member and being isolated from said braking pressure generating member when said first piston member is moved into its second position, said last mentioned movement occurring when said pressure in said chamber reaches a value corresponding to that due to the thrust on said second piston member, said first piston member remaining in its second position independently of fluctuations in the thrust on said thrust member and returning to its first position only by the reduction of the braking force transmitted from said braking pressure generating member.

6. Apparatus as claimed in claim 5 wherin said thrust member is moved by a spring the loading of which is varied by changes in the condition in relation to which the maximum braking pressure is to be controlled.

7. Apparatus as claimed in claim 6 wherein the loading of the spring is determined by the loading of the vehicle.

8. Apparatus as claimed in claim 5 wherein said thrust member is divided into two parts so that the variable thrust is produced by relative axial movement of said two parts produced by deflection of a wheel mounting during braking.

9. Apparatus as claimed in claim 1 wherein said first end of said thrust member is movable in a first direction in said chamber to increase said maximum transmittable braking force and movable in a second direction in said chamber to decrease said maximum transmittable braking force.

References Cited by the Examiner

UNITED STATES PATENTS

| | | | |
|---|---|---|---|
| 2,812,983 | 11/1957 | Bush | 303—211 |
| 3,084,002 | 4/1963 | Peras | 303—22 |
| 3,153,560 | 10/1964 | Biabaud | 303—22 |

MILTON BUCHLER, *Primary Examiner.*

FERGUS S. MIDDLETON, *Examiner.*